H. VIGANO.
SUCTION PLATE FOR ARTIFICIAL TEETH.
APPLICATION FILED SEPT. 30, 1912.
1,068,952.
Patented July 29, 1913.
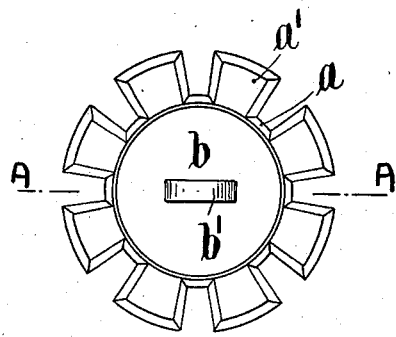
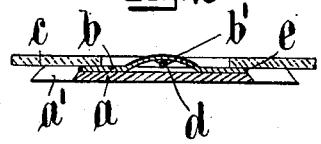
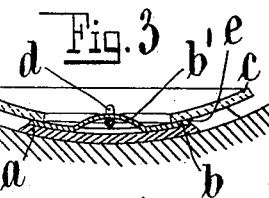
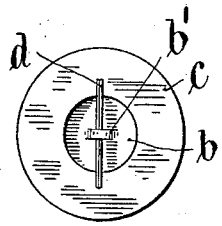
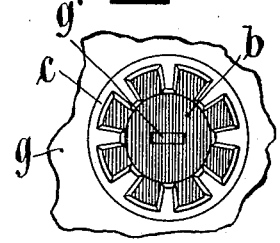
Witnesses
Inventor
Heinrich Vigano
his Attorneys

//UNITED STATES PATENT OFFICE.

HEINRICH VIGANO, OF WILMERSDORF, NEAR BERLIN, GERMANY.

SUCTION-PLATE FOR ARTIFICIAL TEETH.

1,068,952.  Specification of Letters Patent.  Patented July 29, 1913.

Application filed September 30, 1912. Serial No. 723,185.

*To all whom it may concern:*

Be it known that I, HEINRICH VIGANO, a subject of the King of Prussia, residing at Wilmersdorf, near Berlin, Germany, have invented certain new and useful Improvements in Suction-Plates for Artificial Teeth; and I do hereby declare the following to be a full, clear, and exact description of the invention, such as will enable others skilled in the art to which it appertains to make and use the same.

My invention relates to an improved method for producing suction plates for artificial teeth.

In order to obtain a satisfactory suction action the suction chambers have been constructed heretofore with sharp edges and even with undercut edges, which cause painful irritation in most cases, even if they do not considerably injure the mouth. Now the attempt has been made to remedy this defect by providing the suction-chamber with a soft edge rendering at the same time the employment of sharp edges quite unnecessary because a soft edge even if it slopes obliquely outward insures a satisfactory suction action. In some cases a soft rubber disk laid in a recess in the finished rubber plate has been mechanically connected with the latter. In this case, however, the hard edge of the recess in the rubber plate always makes itself unpleasantly felt in the same manner as before, because in the first place since the edge of the soft rubber disk lying in the recess is not connected with the recess, the fit cannot be perfect, and also because the soft rubber disk gives. Further in consequence of saliva having free access on all sides the soft rubber swells unpleasantly, so that it is necessary to change it frequently. Again, hitherto the suction-chamber has sometimes been provided with a soft edge by dipping in chloroform a strip of the rubber employed to form the plate itself and laying it around the suction-chamber and vulcanizing the whole. The strip dipped in chloroform remains soft during the vulcanizing operation and becomes connected with the rest of the rubber, which becomes hard. The rubber which remains soft does not, however, become elastic but plastic so that in the course of time its shape alters, the result being not only that the action of the suction-chamber suffers but that the edge of the hard plate becomes prominent again.

Now according to the present invention the suction-chamber is furnished with a soft edge, the material in its transition into the hard rubber of the plate becoming gradually harder. This progressive increase in hardness renders it impossible for the plate to irritate or injure the palate or roof of the mouth, while the soft edge, which as stated above is old *per se*, insures the suction action being good even if said edge slopes obliquely outward, a point which for the avoidance of irritation and injury is of particular advantage.

In making the suction-chamber the following method may be adopted: A disk of soft rubber, such as cofferdam, of a larger diameter than that of the tin pattern is fixed over said pattern in such a manner that it projects on all sides beyond the edge of the same and then the hard rubber is squeezed over it and both parts are vulcanized together. During the vulcanizing operation the soft rubber disk which remains soft becomes connected firmly with the hard rubber. At the same time the hard rubber at the places of contact gives up sulfur to the soft rubber which thus becomes correspondingly harder, while the hardness of the hard rubber is diminished according to the amount of sulfur given up. Consequently there is produced at the junction between the hard rubber and the soft rubber a place of gradual transition as regards the hardness of the rubber.

It is essential to employ soft rubber (cofferdam), that is to say, hard rubber softened by dipping must not be employed, because soft rubber even after having been vulcanized is still elastic and consequently in use does not suffer permanent deformations, and also because soft rubber does not contain any admixtures which irritate the palate on account of their chemical properties. Moreover it has been found that suction-chambers made according to this new method do not possess the defect that the soft rubber disk forming the soft edge swells, which is partly to be attributed to the feature that the whole surface of the one side of the soft rubber disk is connected so firmly with the plate that expansion is not permitted and partly to the circumstance that only one side of the soft rubber comes into contact with the saliva.

The soft rubber disk must be connected with the pattern in such a manner that said disk does not become displaced while the plate is being squeezed on. This connection may be easily effected with the aid of a pin which engages in a hole in the pattern. A connection so made is, however, unreliable on account of the pattern being so thin and of the softness of the material (tin) of which it is composed.

An extremely reliable connection and one which is much more convenient in use is represented in the accompanying drawing, in which:—

Figure 1 is a plan to a much enlarged scale of the tin pattern and a small attachment-plate which is inserted in said pattern and is adapted to be connected with the soft rubber disk; Fig. 2 a cross-section on the line A—A Fig. 1, the soft rubber disk, however, being shown connected with the attachment-plate; Fig. 3 a cross-section through the parts, shown in Fig. 2, the same being shown in position against the concave surface of a plaster model of the palate after having been pressed against the latter; Fig. 4 a cross-section similar to Fig. 3 after the hard rubber has been squeezed on, the layer of the latter being however omitted for the purpose of showing more clearly the shape assumed by the soft rubber disk; Fig. 5 a plan of Fig. 2 to a smaller scale, and Fig. 6 a plan of a portion of the finished suction-plate containing the suction-chamber, the sunk parts being indicated by vertical cross-hatching.

The tin pattern $a$ is provided at its edge with a series of recesses or incisions in such a manner that a circle of projections $a'$ is produced. The projections $a'$ are thicker than the middle part of the pattern, so that at the bases of the projections there are edges or offsets $e$. All the offsets $e$ lie on a circle. A small attachment-plate $b$ fits into the recess between the offsets $e$. A rubber disk $c$ is connected with said plate by a pin $d$ inserted through an eye $b'$ stamped out of the plate $b$ and resting with its ends projecting over the inner edge of the rubber disk $c$ which is provided with a central hole.

The plate $b$ may be made of such dimensions that it fits exactly into the recess between the offsets $e$ and can be secured therein merely by being pressed into said recess. This would require very accurate work, however, and if there were the least inaccuracy, the insertion of said attachment-plate into the recess would be accompanied with difficulties. According to the drawing (see Figs. 1 and 2) the plate $b$ is given a somewhat smaller diameter than the circle formed by the offsets $e$. Consequently at first the small plate fits loosely in the recess. When, however, the pattern with the small plate therein is pressed against the concave surface of the plaster mold $f$ of the palate in order that it may assume the curved shape shown in Fig. 3, the offsets $e$ approach one another in such a manner that they grasp the edge of the inserted plate after the manner of jaws, said plate being connected as firmly with the pattern as is necessary for the rest of the work.

By pressing out the hard rubber over the soft rubber disk the latter is forced into the intervals between the projections $a'$ of the pattern until it makes contact with the plaster model $f$. Likewise its outer edge which projects beyond the pattern is pressed down on to the plaster model. The soft rubber disk as a result of this operation assumes the shape shown in Fig. 4, and it retains this shape after the vulcanizing process because of the fact that by the said process it becomes firmly connected at one side over its whole surface with the hard rubber squeezed over it. Consequently if after the completion of the vulcanizing operation the tin pattern $a$ be removed, a recess which corresponds in shape to the pattern and which forms the suction-chamber is left in the suction-plate $g$ (see Fig. 6), the recessed edge of which is formed by the soft rubber disk. The more or less flat central bottom is formed by the small metal plate $b$ in the central opening of which at $g'$, where the stamped eye $b'$ is formed, the hard rubber can be seen.

Gold is suitably employed as the material for the small attachment-plate $b$ on account of the fact that the latter remains on the finished suction-plate.

It is not absolutely necessary for the pattern to be provided at its edge with recesses in the manner shown, although its grasping action on plate $b$ is of course improved by said recesses. Instead of providing said recesses the pattern might be provided with a thickened edge without recesses. The form of the pattern with a recessed edge possesses the additional advantage that the suction-chamber edge which has a great influence on the suction action is comparatively long.

In making a suction-chamber with a soft edge, a very advantageous gradation of the hardness can be obtained by vulcanizing together two or more suitably thin rubber disks and the hard rubber, the disks being of different sizes and being arranged in size order in such a way that each disk is connected at its edge with the hard rubber after the vulcanizing operation. By this method the soft rubber layer increases in thickness from its outer edge inward, so that the desired gradation of the hardness can be obtained more effectively than before.

I claim:

1. The herein described method of producing a hard rubber dental plate provided with a suction chamber, which consists in attaching a soft rubber disk on a pattern of less diameter in such position as to protrude over the edges of said pattern, then applying the pattern to a mold with the attached soft rubber disk superimposed thereover, then pressing out hard rubber composition on said disk and forcing the latter over the edges of the pattern into overlapping contact with a portion of the mold surface, and then vulcanizing the rear surface of said soft rubber disk to the hard rubber composition.

2. The herein described method of making a hard rubber dental plate provided with a circular suction chamber having a series of peripheral recesses, which consists in attaching a soft rubber disk on a disk pattern provided with a peripheral series of projections of less diameter than said rubber disk, then applying the pattern to a mold with the soft rubber disk super-imposed thereover, then pressing a hard rubber composition on said disk and forcing the latter over the edges of the pattern and between the peripheral projections thereof into overlapping contact with a portion of the mold surface, and then vulcanizing the entire rear surface of said soft rubber disk to the hard rubber composition.

In testimony whereof, I affix my signature, in presence of two witnesses.

HEINRICH VIGANO.

Witnesses:
AUGUST TRAUTMANN,
WOLDEMAR HAUPT.

---

Copies of this patent may be obtained for five cents each, by addressing the "Commissioner of Patents, Washington, D. C."